United States Patent [19]

Otomo et al.

[11] Patent Number: 4,745,507

[45] Date of Patent: May 17, 1988

[54] COMPOSITE TYPE MAGNETIC HEAD WITH NON-MAGNETIC MEMBER IN COIL MOUNTING PORTION

[75] Inventors: Shigekazu Otomo, Sayama; Noriyuki Kumasaka, Ome; Takeo Yamashita, Tachikawa; Juichi Morikawa, Katsuta; Hideo Fujiwara; Osamu Inagoya, both of Ibaraki; Takeshi Tottori, Toride; Masashi Hayashi, Katsuta, all of Japan

[73] Assignee: Hitachi, Ltd., Tokyo, Japan

[21] Appl. No.: 826,340

[22] Filed: Feb. 5, 1986

[30] Foreign Application Priority Data

Feb. 13, 1985 [JP] Japan .................................. 60-24305

[51] Int. Cl.$^4$ ............................................ G11B 5/127
[52] U.S. Cl. .................................... 360/125; 360/119; 360/123
[58] Field of Search ............... 360/125, 110, 123, 119, 360/120, 122, 126, 127

[56] References Cited

FOREIGN PATENT DOCUMENTS

| | | | |
|---|---|---|---|
| 0115842 | 8/1984 | European Pat. Off. | ............ 360/125 |
| 0125891 | 11/1984 | European Pat. Off. | . |
| 0140977 | 5/1985 | European Pat. Off. | . |
| 0140708 | 12/1976 | Japan | . |
| 0116809 | 10/1978 | Japan | .................... 360/119 |
| 0099611 | 6/1979 | Japan | .................... 360/125 |
| 0093828 | 6/1980 | Japan | . |
| 0017522 | 2/1983 | Japan | .................... 360/120 |
| 0155513 | 9/1983 | Japan | .................... 360/122 |
| 0142716 | 8/1984 | Japan | . |
| 0207415 | 11/1984 | Japan | .................... 360/110 |
| 0231903 | 10/1985 | Japan | .................... 360/119 |

Primary Examiner—John H. Wolff
Assistant Examiner—David J. Severin
Attorney, Agent, or Firm—Antonelli, Terry & Wands

[57] ABSTRACT

A composite type magnetic head wherein a functional gap is formed by a pair of opposing magnetic metal substance members coupled to a substrate of a nonmagnetic substance and include a head front surface facing a magnetic recording medium. A coil portion is provided rearwardly of the head front surface and includes a coil window provided between the pair of magnetic metal substance members and a coil for encircling both the nonmagnetic substance substrate and at least one of the magnetic metal substance members coupled to the substrate. A rear core portion is provided rearwardly of the coil portion and is magnetically coupled with the magnetic metal substance members, the rear core portion including at least a part made of a high permeability ferrite.

18 Claims, 3 Drawing Sheets

COMPOSITE TYPE MAGNETIC HEAD WITH NON-MAGNETIC MEMBER IN COIL MOUNTING PORTION

BACKGROUND OF THE INVENTION

The present invention relates to magnetic heads, and more particularly to a magnetic head which is well suited for application to a magnetic recording medium of high coercive force and which has characteristics of high output.

A request for a higher degree of magnetic recording technique, especially for a higher density of magnetic recording, is very eager nowadays.

It is well known that increasing the coercive force $H_c$ of a magnetic recording medium is advantageous for meeting the request. However, a magnetic field having a high intensity and a sharp distribution is needed for recording a signal on a magnetic recording medium of high coercive force. In this regard, in case of using a hitherto-conventional ferrite of high permeability for a magnetic head, the intensity of a recording magnetic field to be attained is limited because the saturation flux density $B_s$ of the ferrite is below 5500 G. This has led to the problem of insufficient recording especially when magnetic tapes of high coercive force being recently developed are employed.

To the end of solving the problem, there has been proposed a magnetic head wherein as shown in FIG. 1, a magnetic metal substance 1 having a high saturation flux density is afforded to the functional gap portion of a head core made of members of the high permeability ferrite 2 and 2', to generate an intense recording magnetic field. Numeral 3 designates a surface facing the magnetic tape. (The details are described in the official gazette of Japanese Patent Application Laid-Open No. 51-140708. Besides, to the end of improving the abrasion-resisting property of a head core, there has been proposed a magnetic head wherein as shown in FIG. 2, the surfaces of the high permeability ferrite members 2 and 2' of the magnetic head core facing the magnetic tape are made of a nonmagnetic substance of excellent abrasion-resisting property 4 (the details are described in the official gazette of Japanese Patent Application Laid-Open No. 58-17522). In FIG. 2, numeral 1 designates a magnetic metal substance. Likewise, a magnetic head has been proposed wherein the surface facing the tape is made of the nonmagnetic substance, a rear magnetic core is made of the high permeability ferrite and the vicinity of a functional gap is made of the magnetic metal substance of high saturation flux density (the details are described in the official gazettes of Japanese Patent Application Laid-Open No. 53-116809 and Japanese Utility Model Registration Application Laid-Open No. 55-93828). It is stated in the official gazette of Japanese Patent Application Laid-Open No. 53-116809 that, since the boundary 5 between the magnetic metal substance 1 and the high permeability ferrite 2 or 2' unpreferably acts as a pseudo gap in the head of FIG. 1, the portion of the surface of the ferrite core facing the tape is made of the nonmagnetic substance as shown in FIG. 2, thereby to bring forth the effect of preventing the pseudo gap from appearing. In the official gazette of Japanese Utility Model Registration Application Laid-Open No. 55-93828, it is stated that the portion of the surface of the ferrite core facing the tape is made of the nonmagnetic substance, which is effective to reduce rubbing noise.

In addition, a magnetic head of a structure in which a pair of magnetic metal members coupled on a nonmagnetic substrate are opposed through a functional gap is described in the official gazettes of Japanese Patent Application Laid-Open No. 59-142716 and European Patent Application Laid-Open No. 0140977.

In general, it can be said that the characteristics of a magnetic head are more excellent as the output C per turn of a coil is higher and as the inductance L per turn of the coil is lower. It is known that the output which can be derived from the magnetic head increases in proportion to the number of turns, and that the inductance of the magnetic head increases in proportion to the square of the number of turns. On account of a requirement for an amplifier circuit, the inductance needs to be suppressed below a certain value determined for each circuit. Accordingly, for the purpose of fabricating a magnetic head exhibitive of a high output with the inductance held below the above value, it is necessary to raise the output per turn to the utmost, namely, to raise the recording and reproducing efficiencies, and besides, to lower the inductance per turn so that the number of turns can be increased within the fixed inductance. In other words, letting L denote the value of the inductance, a higher output C should desirably be obtained for the certain fixed value L or $\sqrt{L}$.

In view of the foregoing, the performance of a magnetic head can be expressed with the ratio $C/\sqrt{L}$ between the output C and the square root of the inductance.

SUMMARY OF THE INVENTION

An object of the present invention is to provide, in a magnetic head wherein the vicinity of a functional gap is made of a magnetic metal substance, a magnetic head which has high recording and reproducing efficiencies and a low inductance per turn of a coil and accordingly presents excellent characteristics.

In order to accomplish the object, the magnetic head of the present invention is so constructed that in a portion on a side of a surface facing a magnetic recording medium, namely, in a front portion, a pair of members of a magnetic metal substance coupled on a substrate of a nonmagnetic substance are confronted to each other through a functional gap, that in a coil portion continuing rearward of said portion on the side of said surface facing the magnetic recording medium, a coil encircles both the nonmagnetic substance substrate and the magnetic metal substance members coupled on said substrate, a coil window being provided between the pair of magnetic metal substance members, and that at least a part of a rear core continuing further rearward of said coil portion and magnetically coupled with said magnetic metal substance is made of a high permeability ferrite.

BRIEF DESCRIPTION OF THE DRAWINGS

FIG. 7b is a side view of the magnetic head shown in FIG. 7a;

DETAILED DESCRIPTION OF THE INVENTION

Figure 3:
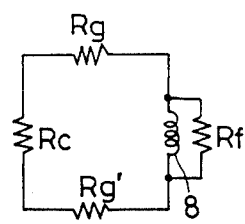
FIG. 3 is an equivalent magnetic circuit diagram of a magnetic head.

The equivalent magnetic circuit of a magnetic head can be schematically expressed as shown in FIG. 3. Here, $R_g$ denotes the magnetic reluctance of a functional gap portion, $R_c$ the magnetic reluctance of a core, $R_g'$ the magnetic reluctance of a rear gap, and $R_f$ the leakage magnetic reluctance of the portion of a coil 8. The inductance L is denoted as $L=N^2/R_t$ where $R_t$ indicates the whole magnetic reluctance viewed from the coil side. Here, N indicates the number of turns. $R_t$ can be expressed as:

$$\frac{1}{R_t} = \frac{1}{R_g + R_g' + R_c} + \frac{1}{R_f}$$

Accordingly, the inductance can be decreased by increasing any of $R_g$, $R_g'$, $R_c$ and $R_f$. On the other hand, the reproducing efficiency $\eta$ of the magnetic head can be expressed as:

$$\eta = \frac{R_g}{R_g + R_g' + R_c}$$

Accordingly, the reproducing efficiency can be raised by increasing $R_g$ or decreasing $R_g'$ or $R_c$. Among these magnetic reluctances, $R_g$ is substantially fixed by a gap length and a gap depth. Accordingly, in order to fabricate an excellent magnetic head, it needs to be designed so as to decrease $R_g'$ and $R_c$ and to increase $R_f$.

Figure 1:
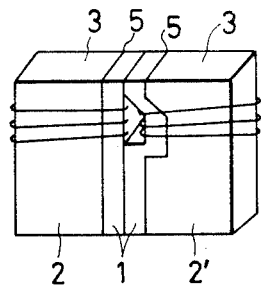
FIGS. 1 and 2 are perspective views each showing a prior-art magnetic head.
Figure 4:
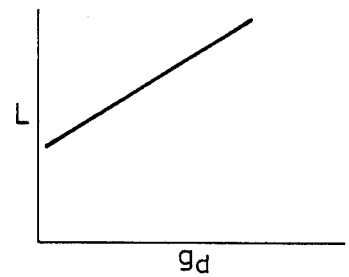
FIG. 4 is a graph showing the relationship between the gap depth $g_d$ and the inductance L of a magnetic head.

As the gap depth $g_d$ of the magnetic head shown in FIG. 1 is decreased, the inductance L lowers as illustrated in FIG. 4. This is based on the increase of $R_g$ in FIG. 3. The reason why a certain inductance is exhibited even at $g_d=0$, is that $R_f$ is comparatively low, so a leakage magnetic flux exists around the coil. The units of the axis of ordinates and the axis of abscissas in FIG. 4 are arbitrary. For the purpose of increasing $R_f$ and reducing the leakage magnetic flux, it is effective to diminish the cross-sectional area of the core in the coil portion thereby to decrease the length of the coil, and also to lower the permeability of the core. Since, however, both these measures increase the magnetic reluctance $R_c$ of the core and lower the reproducing efficiency $\eta$, the configuration of the head must be determined so as to maximize the ratio $C/\sqrt{L}$ between the output C and the square root of the inductance as stated before. The inventors measured the outputs and inductances of the magnetic head shown in FIG. 1 and a magnetic head wherein the high permeability ferrite members 2 and 2' of the magnetic head in FIG. 1 are replaced with members of a non-magnetic substance. As a result, it has been revealed that the magnetic head employing the non-magnetic substance is lower in the output per turn of the coil than the magnetic head employing the high permeability ferrite, but is also lower in the inductance, and that the value $C/\sqrt{L}$ is greater in the magnetic head employing the nonmagnetic substance. This is based on the fact that, by substituting the nonmagnetic substance for the high permeability ferrite of the core members 2 and 2' in the coil portion, the cross-sectional area of the magnetic core portion of high permeability is reduced to correspond to the cross-sectional area of the magnetic metal substance 1 so as to increase $R_f$, while the increase of $R_c$ is suppressed to be small owing to the presence of the magnetic metal substance of high permeability.

Figure 2:
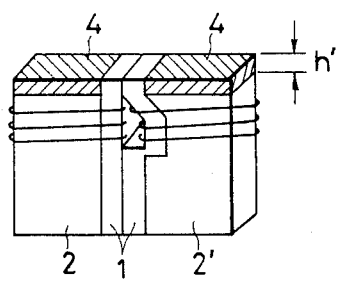
Figure 5:
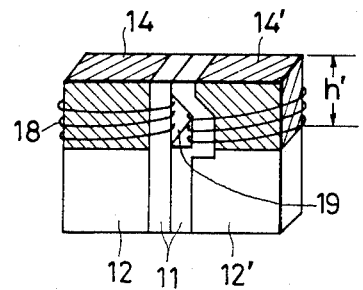
FIGS. 5, 6, 7a and 8 are perspective views of magnetic heads in several embodiments of the present invention.

In order to fabricate a magnetic head of high performance which is still greater in $C/\sqrt{L}$ than the above magnetic head wherein the high permeability ferrite of the members 2 and 2' is replaced with the nonmagnetic substance, the magnetic head of the present invention typically has a structure in FIG. 5. In this magnetic head, a magnetic core which extends from a surface facing a tape to a coil portion is constructed of members of a nonmagnetic substance 14 and 14', whereby a magnetic material inside a coil 18 consists essentially of only a magnetic metal substance 11, to increase the magnetic reluctance $R_f$ and to lower the inductance, and a rear core except the coil portion is constructed of members of a high permeability ferrite 12 and 12', whereby the increase of the magnetic reluctance $R_c$ of the core is suppressed to suppress the decrease of the reproducing efficiency. Thus, $C/\sqrt{L}$ can be enhanced more. Moreover, the head of the present invention is superior in being effective to enhance the abrasion-resisting property and to reduce the tape rubbing noise likewise to the head shown in FIG. 2. Numeral 19 indicates a coil window. In the magnetic head shown in FIG. 2, since $R_f$ is nearly equal to that of the magnetic head employing the high permeability ferrite as shown in FIG. 1, the inductance does not vary, and since the vicinity of the surface facing the magnetic tape is made of the nonmagnetic substance, $R_c$ somewhat increases to lower the reproducing efficiency. Therefore, $C/\sqrt{L}$ is equal to or somewhat lower than that of the magnetic head employing the high permeability ferrite as shown in FIG. 1. Accordingly, the magnetic head of the present invention as shown in FIG. 5 is an excellent magnetic head which is the greatest in $C/\sqrt{L}$ among the aforementioned magnetic heads and which simultaneously has the good abrasion-resisting property and the low rubbing noise characteristic.

Figure 6:
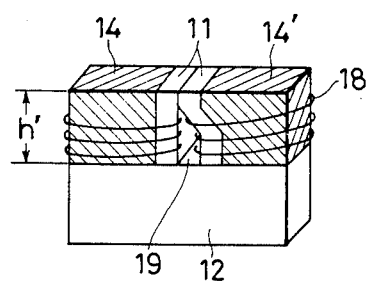

A magnetic head of higher performance according to the present invention is a magnetic head in which the whole rear core is constructed of a member of the high permeability ferrite 12 as shown in FIG. 6. With this head, since the magnetic reluctance $R_g'$ of the rear gap in FIG. 3 can be removed, the reproducing efficiency can be further raised. The gap between the magnetic metal substance 11 and the high permeability ferrite 12 is very small, and a magnetic reluctance attributed to this gap may be ignored. In FIG. 6, portions 14, 14', 18 and 19 are similar to those in FIG. 5.

Figure 7A:
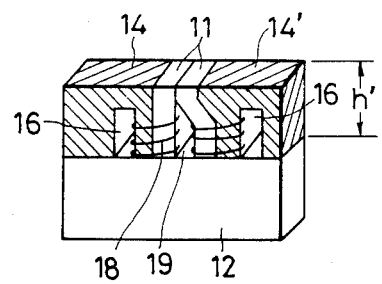
Figure 7B:
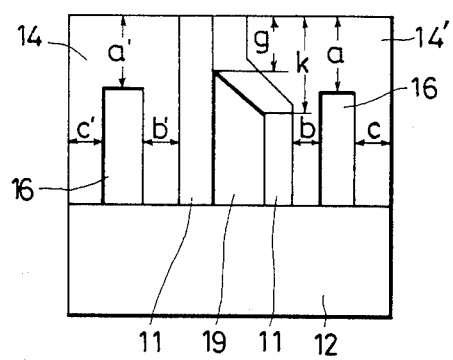

Another example of the magnetic head of the present invention is as shown in FIG. 7a, in which a core employing members of a nonmagnetic substance 14 and 14' is provided with grooves 16 substantially parallel to the plane of a functional gap, a coil 18 is wound between the grooves and a coil window 19, and a member of high permeability ferrite 12 is joined as a rear core in order to construct a rear magnetic circuit. Numeral 11 designates a magnetic metal substance. With this magnetic head, by winding the coil 18 between the grooves 16 and the coil window 19, the length of the coil can be reduced to further lower the inductance. It is also effective to provide the groove 16 in only one side of the core. Moreover, since no rear gap is included as in the case of FIG. 6, the magnetic reluctance $R_g'$ of the rear gap can be removed to raise the reproducing efficiency. A side view of this magnetic head is shown in FIG. 7b. Reference numerals in FIG. 7b are the same as in FIG. 7a, and the coil is omitted from the illustration of FIG. 7b. Now, the position and shape of the groove 16 will be described.

The groove 16 may be so shaped that the coil can be wound substantially between the coil window 19 and the groove 16. It is necessary for increasing the strength of the core that the distance a or a' from the upper end of the groove 16 to the surface facing the tape is greater than a gap depth g, and that distance should desirably be nearly equal to the distance k from the surface facing the tape to the lower end of the slant part of the coil window 19. It is also possible to make the distance a or a' longer than the distance k, within a range in which the coil can be wound. Each of the distances b and b' between the grooves 16 and the corresponding members of the magnetic metal substance 11 defining the coil window 19 and the distances c and c' from the respective grooves 16 to the outer periphery of the core should desirably be made 100 μm or more so as not to lower the strength of the core.

Figure 8:
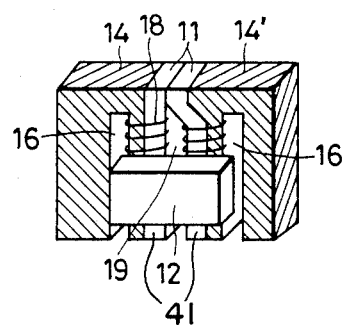

Still another example of the magnetic head of the present invention is a magnetic head in which, as shown in FIG. 8, a member of high permeability ferrite 12 constructing a rear core is joined to a side surface 41 of the magnetic head. The effect of this magnetic head is that, since a coil 18 fabricated beforehand can be mounted between a coil window 19 and grooves 16 before joining the high permeability ferrite core 12, the coil winding step is facilitated. This effect is important for the magnetic head as in the present invention intended to increase the output by lowering the inductance and enlarging the number of turns. The other symbols as in FIG. 8 are the same as in FIG. 7a. The expression "side surface of the magnetic head" signifies a surface which is substantially perpendicular to the surface facing the magnetic recording medium and which is substantially parallel to the traveling direction of the magnetic recording medium.

Figure 9:
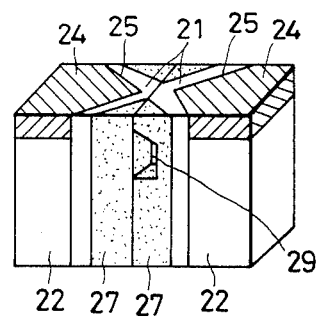
FIG. 9 is a perspective view showing another prior-art magnetic head.
Figure 10:
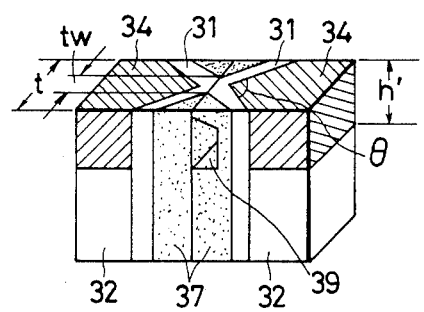
FIGS. 10, 11, 12 and 13 are perspective views of magnetic heads in other several embodiments of the present invention.
Figure 11:
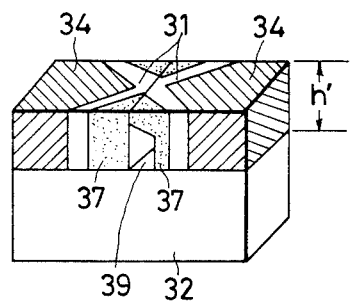
Figure 12:
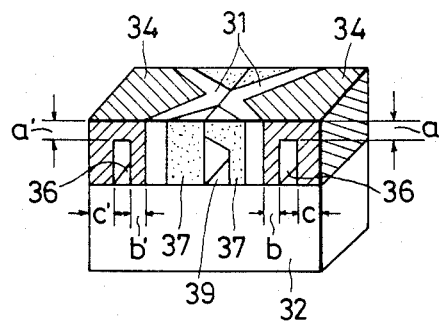
Figure 13:
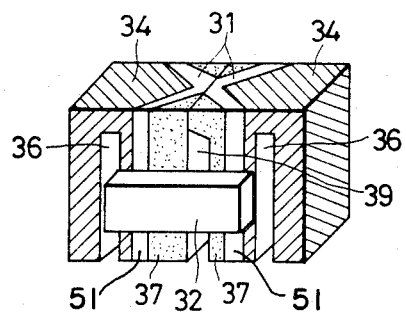

In each of the magnetic heads of the present invention illustrated in FIG. 5, FIG. 6, FIG. $7_a$ and FIG. 8, the functional gap in the surface facing the magnetic tape is parallel to the end face of the magnetic metal substance, that is, it is parallel to the boundaries between the members of the magnetic metal substance 11 and the members of the nonmagnetic substance 14, 14'. Such an end face parallel to the functional gap is unfavorable because it forms the cause of the contour effect. To the end of solving this drawback, a magnetic head has been proposed in Japanese Patent Application No. 59-87692 wherein, as shown in FIG. 9, a magnetic metal member 21 is coupled to a high permeability ferrite member 22 and a nonmagnetic member 24 which form an angled core portion, whereby the interface 25 between the magnetic metal member 21 and the nonmagnetic member 24 becomes nonparallel to the functional gap in the surface facing the magnetic tape. Numeral 27 indicates a nonmagnetic coupling material such as glass, and numeral 29 a coil window. The present invention is also effective for such a magnetic head. Magnetic heads as shown in FIGS. 10 and 11, in each of which the portion of the nonmagnetic substance 24 in the magnetic head of FIG. 9 is expanded to the coil portion, have effects similar to those of the magnetic heads shown in FIGS. 5 and 6. Likewise, magnetic heads shown in FIGS. 12 and 13 in each of which the nonmagnetic substance is provided with grooves 36 bring forth effects similar to those of the magnetic heads shown in FIGS. $7_a$ and 8. In FIG. 13, numeral 51 designates the side surface of the magnetic head. Although the coil is omitted from the illustration of each of FIGS. 9–13, it shall be mounted. In FIGS. 10–13, numeral 31 designates the magnetic metal substance, numeral 32 the high permeability ferrite forming the rear core, numeral 34 the nonmagnetic substance, numeral 36 the groove, numeral 37 the nonmagnetic coupling substance such as glass, and numeral 39 the coil window.

The magnetic metal substance 31 of the magnetic heads of the present invention shown in FIGS. 10–13 will be described more. The pair of magnetic metal members 31 consists of a pair of magnetic metal films each of which has a substantially V-shaped sectional shape, and which have their protrusions butted to each other through the nonmagnetic gap members so as to form the functional gap. The V-shaped sectional portion of the magnetic metal film is exposed to the surface facing the magnetic recording medium. In addition, the fore ends of the protrusions of the pair of magnetic metal films are planes which are parallel to each other and which are substantially orthogonal to the traveling direction of the magnetic recording medium. The width of a plane which is indicated by the lines of intersection between the planes of the fore ends of the protrusions and the surface facing the magnetic recording medium corresponds to a track width. Further, the magnetic metal films are formed on a substrate which has angled projections corresponding to the V-shaped portions of the films and which is made of the nonmagnetic substance 34 and the high permeability ferrite 32 or made of only the nonmagnetic substance 34.

The substrate of the magnetic head of the present invention shown in FIG. 10 is made of the high permeability ferrite 32 and the nonmagnetic substance 34 as stated before. In this regard, magnetic heads in each of which the whole substrate is made of the high permeability ferrite without using the non-magnetic substance 34 are disclosed in the official gazettes of Japanese Patent Application Laid-Open No. 58-155513 and Japanese Patent Application Laid-Open No. 59-207415. The magnetic head of the present invention shown in FIG. 10 is such that, in these known magnetic heads, the substrate portion from the surface facing the magnetic recording medium to the rear end of the coil window is replaced with the nonmagnetic substance 34, and the heads shown in FIGS. 11–13 are the modified embodiments or improved examples of the embodiment of FIG. 10. Accordingly, the magnetic heads may conform to the known techniques as to matters not described in this specification. Patent applications corresponding to the aforementioned Japanese Patent Application Laid-Open No. 59-207415 have been filed in United States and Europe (with designated countries being Britain, West Germany and France). The Application Nos. of the respective patent applications are 608407 and 84303167.5, and the Application Laid-Open No. of the latter patent application is 0125891. Besides, heads in each of which the whole substrate is made of the nonmagnetic substance are described in the official gazettes of European Patent Application Laid-Open No. 0140977 and Japanese Patent Application Laid-Open No. 59-142716, and these techniques can also be utilized.

The magnetic metal substance for use in the magnetic head of the present invention may be any material of high permeability which has a high saturation flux density. As typical materials, it is possible to mention well-known alloys such as Fe-Si alloys, Fe-Al-Si alloys (so-called sendust alloys), Ni-Fe alloys (so-called permalloys) and various amorphous alloys of high permeability. While the amorphous alloys include various metal-metalloid amorphous alloys in which Fe-Co contains metalloid elements, metal-metal amorphous alloys principally composed of Co which are excellent in the corrosion-resisting and abrasion-resisting properties and which exhibit excellent characteristics as binary or ternary alloys are preferable. Mentioned as the examples are such systems as Co-Zr, Co-Nb, Co-Nb-Zr, Co-Mo-Zr, Co-W-Zr, Co-Ni-Zr, Co-Zr-B, Co-Hf and Co-Ti.

The thickness of the magnetic metal substance is recommended to be 0.5 μm–100 μm. A thickness value less than 0.5 μm is unpreferable because of an increased magnetic reluctance. On the other hand, a value in excess of 100 μm is unnecessarily great, and especially in case of manufacturing the magnetic metal substance by the use of the thin film forming technique, such a thickness is unpreferable because of a long period of time required for the formation of the magnetic metal substance. Regarding the magnetic heads of the structures as shown in FIGS. 10–13, as is known, it is advantageous for the manufacturing process that the thickness of the magnetic metal substance is set at about ½ of the track width.

As the magnetic metal substance, a thin plate cut out of a bulky material or a ribbon produced by the rapid quenching method may well be employed. However, it is more preferable to employ a magnetic metal film produced by the thin film forming technique such as sputtering or vacuum deposition. Especially in case of fabricating the magnetic heads shown in FIGS. 10–13, the fabrication is difficult unless the magnetic metal films are used. In case of using the magnetic metal films, it is also possible to lower the eddy current loss and enhance the high frequency characteristics, by alternately stacking the magnetic metal films and nonmagnetic insulator films of $SiO_2$, $Al_2O_3$ or the like.

As the nonmagnetic substance in the present invention, it is possible to employ any material of excellent abrasion-resisting property selected from among nonmagnetic ferrites, various ceramics, hard glass, etc. As the high permeability ferrite in the present invention, it is possible to employ the polycrystal or single crystal of Mn-Zn ferrite or Ni-Zn ferrite.

DESCRIPTION OF THE PREFERRED EMBODIMENTS

EXAMPLE 1

The magnetic head shown in FIG. 1, the magnetic head with the nonmagnetic substance substituted for the high permeability ferrite of the members 2 and 2' in FIG. 1, and the magnetic heads shown in FIGS. 2, 5, 6 and 7a were fabricated using Zn ferrite as the nonmagnetic substance, the polycrystal material of the Mn-Zn ferrite as the high permeability ferrite, and sputtered amorphous alloy films having a composition of $Co_{84}Nb_{13}Zr_3$ (atomic-%) as the magnetic metal substance. In the magnetic heads mentioned above, those shown in FIGS. 5, 6 and $7_a$ are the embodiments of the present invention, and the others are reference examples. Coils were wound on these heads, and inductances at 4 MHz, and outputs at 4 MHz provided when signals were recorded and reproduced with a metal tape were measured. The relative speed between the tape and the head was 3.8 m/s. Measured results are listed in Table 1.

TABLE 1

| No. | Structure of Magnetic Head | Output C (Relative Value) | Inductance (Relative Value) | $C/\sqrt{L}$ (Relative Value) |
| --- | --- | --- | --- | --- |
| 1 | FIG. 1 <br> 2, 2': Ferrite substrate, | 1.0 | 1.0 | 1.0 |
| 2 | FIG. 1 <br> 2, 2': Nonmagnetic substrate | 0.88 | 0.60 | 1.14 |
| 3 | FIG. 2 | 0.97 | 0.99 | 0.98 |
| 4 | FIG. 5 | 0.92 | 0.61 | 1.18 |
| 5 | FIG. 6 | 0.94 | 0.62 | 1.19 |
| 6 | FIG. 7a | 0.94 | 0.55 | 1.26 |

As indicated in Table 1, when the heads Nos. 4, 5 and 6 of the present invention are compared with the heads Nos. 1, 2 and 3 of the reference examples, they are inferior to No. 1 in the output but are smaller in the inductance, and they are more excellent in the ratio $C/\sqrt{L}$. Further, since the surface facing the tape is made of the nonmagnetic substance, the present invention can provide heads of low rubbing noise and excellent abrasion-resisting property.

Figure 14:
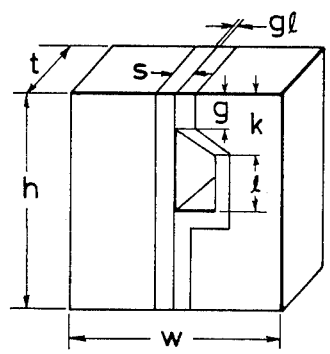
FIG. 14 is a perspective view of a core for explaining the dimensions of a magnetic head.

Next, the dimensions of the magnetic heads in these examples will be explained. FIG. 14 is a perspective view of a core for indicating the core dimensions of the magnetic head shown in FIG. 1. Symbols in FIG. 14 are as follows. Symbol w denotes the width of the core, symbol h the height of the core, symbol t the thickness of the core, symbol g the gap depth as in FIG. 7b, symbol gl a gap length, symbol k the distance from the surface facing the tape to the lower end of the slant portion of the coil window as in FIG. 7b, symbol 1 the height of the window, and symbol s the thickness of the magnetic metal substance. In the embodiments and the reference examples, w was 2 mm, h was 2 mm, t was 60 μm, g was 50 μm, gl was 0.3 μm, k was 200 μm, 1 was 300 μm, and s was 50 μm. Regarding the non-magnetic substance shown in FIGS. 2, 5, 6 and 7a, the height h' thereof was 50 μm in FIG. 2 and 500 μm in any of FIGS. 5, 6 and 7a. In case of the magnetic head shown in FIG. 7a, dimensions relevant to the groove 16 indicated by symbols a, a', b, b', c and c' in FIG. 7b were all set at 200 μm. The number of turns of the coil was 20 turns in any of the cases.

EXAMPLE 2

Next, the magnetic heads shown in FIGS. 10, 11 and 12 were fabricated using the same materials as in Example 1 described above, and the outputs C and inductances L thereof were measured in the same way as in Example 1. Results are listed in Table 2. The foregoing sample No. 1 is mentioned as a reference example again.

TABLE 2

| No. | Structure of Magnetic Head | Output C (Relative Value) | Inductance L (Relative Value) | C/√L (Relative Value) |
|---|---|---|---|---|
| 1 | FIG. 1 (2, 2': Ferrite substrate) | 1.0 | 1.0 | 1.0 |
| 7 | FIG. 10 | 1.12 | 0.68 | 1.35 |
| 8 | FIG. 11 | 1.16 | 0.70 | 1.39 |
| 9 | FIG. 12 | 1.16 | 0.63 | 1.46 |

The magnetic heads of the embodiments, in each of which the angled core and the magnetic metal substance are coupled as described before, are excellent heads wherein since a magnetic path is in a shape fined more nearer to the gap, the recording and reproducing efficiencies are high and wherein since the boundary between the magnetic metal substance and the nonmagnetic substance is not parallel to the gap plane as described before, the contour effect is not involved. Further, owing to the effects of the present invention, the inductance is low and the ratio $C/\sqrt{L}$ is therefore very excellent as indicated in Table 2, and besides, the rubbing noise is low and the abrasion resistance is high.

Next, the dimensions of the magnetic heads in the embodiments will be explained. In case of the magnetic head shown in FIG. 10, the core thickness t was 180 μm, the track width $t_w$ was 60 μm, the vertical angle θ of the angled nonmagnetic member 34 was 60°, and the height h' of the nonmagnetic member 34 was 500 μm. The dimensions of the other parts were the same as in the reference example of FIG. 1 referred to in Example 1. Also in case of the magnetic head shown in FIG. 11, the height h' of the nonmagnetic member 34 was 500 μm, and the other dimensions were the same as in the case of FIG. 10. In case of the magnetic head shown in FIG. 12, the dimensions a, a', b, b', c and c' were 200 μm, and the other dimensions were the same as in the case of FIG. 10. The number of turns of the coil was 20 turns in any of the cases.

Also the magnetic heads shown in FIGS. 8 and 13 are great in the ratio $C/\sqrt{L}$. In addition, these magnetic heads are excellent in mass-producibility because the coil can be mounted in such a way that the coil formed beforehand is inserted between the coil window and the groove 16 or 36.

As thus far described, the magnetic head of the present invention is high in the ratio $C/\sqrt{L}$ and therefore has the excellent properties of high output and low inductance. Moreover, it is low in the rubbing noise and is excellent in the abrasion resistance as well as the mass-producibility.

Incidentally, in the magnetic head of the present invention, conventional knowledges and known teachings may be adopted in connection with matters not specifically described in the instant specification.

What is claimed is:

1. A magnetic head comprising a forward portion including a head front surface facing a magnetic recording medium, said forward portion including a pair of members of a magnetic metal substance coupled to a substrate of a nonmagnetic substance, said pair of magnetic metal substance members opposing each other through a functional gap, and a coil mounting portion provided at a rearward part of said forward portion, said coil mounting portion including a coil window provided between said pair of magnetic metal substance members and a coil for encircling both said nonmagnetic substance substrate and at least one of said magnetic metal substance members coupled to said substrate, and at least a rear core portion provided rearwardly of said coil mounting portion and magnetically coupled with said magnetic metal substance members, said rear core portion including at least a part made of a high permeability ferrite.

2. A magnetic head according to claim 1, wherein said rear core portion is entirely a high permeability ferrite.

3. A magnetic head according to claim 1, wherein said rear core portion of the high permeability ferrite is coupled to a side surface of said forward portions, said side surface being substantially perpendicular to said head front surface facing the magnetic recording medium and substantially parallel to a traveling direction of the magnetic recording medium.

4. A magnetic head according to claim 1, wherein a pair of nonmagnetic substrates are coupled to said pair of magnetic metal substance members and at least one of said nonmagnetic substance substrates in said coil mounting portion is provided with a groove which is parallel to a plane of said functional gap, and said coil is disposed between said groove and said coil window.

5. A magnetic head according to claim 1, wherein at least in said head front surface facing the magnetic recording medium, a coupling portion between said magnetic metal substance member and said nonmagnetic substance substrate does not have a part which is parallel to said functional gap.

6. A magnetic head according to claim 5, wherein said pair of magnetic metal substance members are a pair of magnetic metal films each of which has a substantially V-shaped cross-sectional shape and whose protrusions with flat fore ends are butted to each other through a nonmagnetic gap material so as to form said functional gap, the V-shaped sectional parts of said magnetic metal films are exposed to said head front surface facing the magnetic recording medium, and said magnetic metal films are formed on a pair of said nonmagnetic substance substrates which have angled protrusions corresponding to the V-shape.

7. A magnetic head according to claim 6, wherein said rear core portion is entirely made of the high permeability ferrite.

8. A magnetic head according to claim 6, wherein the high permeability ferrite is coupled to a side surface of said forward portion, said side surface being sunstantially perpendicular to said surface facing the magnetic recording medium and substantially parallel to a traveling direction of the magnetic recording medium.

9. A magnetic head according to claim 6, wherein at least one of said nonmagnetic substance substrates in said coil mounting portion is provided with a groove which is parallel to a plane of said functional gap, and said coil is disposed between said groove and said coil window.

10. A composite type magnetic head comprising:
a pair of opposing magnetic metal substance members forming a functional gap and extending in a direction substantially perpendicular to a magnetic recording medium, said pair of opposing metal substance members having a front end surface facing the magnetic recording medium;
a pair of nonmagnetic substance members adjacent said pair of opposing magnetic metal substance members, said pair of nonmagnetic substance members having a front end surface facing the magnetic recording medium;

a substrate having at least one portion formed of a high permeability ferrite, being disposed at least adjacent said pair of nonmagnetic substance members and magnetically coupled with said pair of magnetic metal substance members;

a coil window provided between said pair of opposing magnetic metal substance members; and a coil wound through said coil window and around both a portion of at least one of said magnetic metal substance members adjacent said coil window and a portion of at least one of said nonmagnetic substance members so as to provide the magnetic head with a low inductance and high output.

11. A composite type magnetic head according to claim 10, wherein said substrate is entirely a high permeability ferrite.

12. A composite type magnetic head according to claim 10, wherein said substrate is magnetically coupled with said pair of magnetic metal substance members and said pair of nonmagnetic substance members at a side surface portion thereof adjacent said coil window.

13. A composite type magnetic head according to claim 10, wherein at least one of said nonmagnetic substance members includes a groove which is parallel to a plane of said functional gap, said coil being wound through said coil window and said groove.

14. A composite type magnetic head according to claim 10, wherein a coupling portion at the front end surface of the head between said magnetic metal substance members and said nonmagnetic substance members extends in a nonparallel direction to said functional gap.

15. A composite type magnetic head according to claim 10, wherein said pair of nonmagnetic substance members have a substantially V-shaped cross sectional shape as viewed from the front end surface, said pair of magnetic metal substance being formed by a pair of magnetic metal films on said V-shaped nonmagnetic substance members having protrusions butted to each other through a nonmagnetic gap material so as to form said functional gap.

16. A composite type magnetic head according to claim 14, wherein said substrate is entirely a high permeability ferrite.

17. A composite type magnetic head according to claim 14, wherein said substrate is magnetically coupled with said pair of magnetic metal substance members and said pair of nonmagnetic substance members at a side surface portion thereof adjacent said coil window.

18. A composite type magnetic head according to claim 14, wherein at least one of said nonmagnetic substance members includes a groove which is parallel to a plane of said functional gap, said coil being wound through said coil window and said groove.

* * * * *